March 19, 1929.  J. KARMAZIN  1,705,572
METHOD AND APPARATUS FOR ASSEMBLING RADIATOR SECTIONS BY SOLDERING
Filed July 10, 1925  2 Sheets-Sheet 1
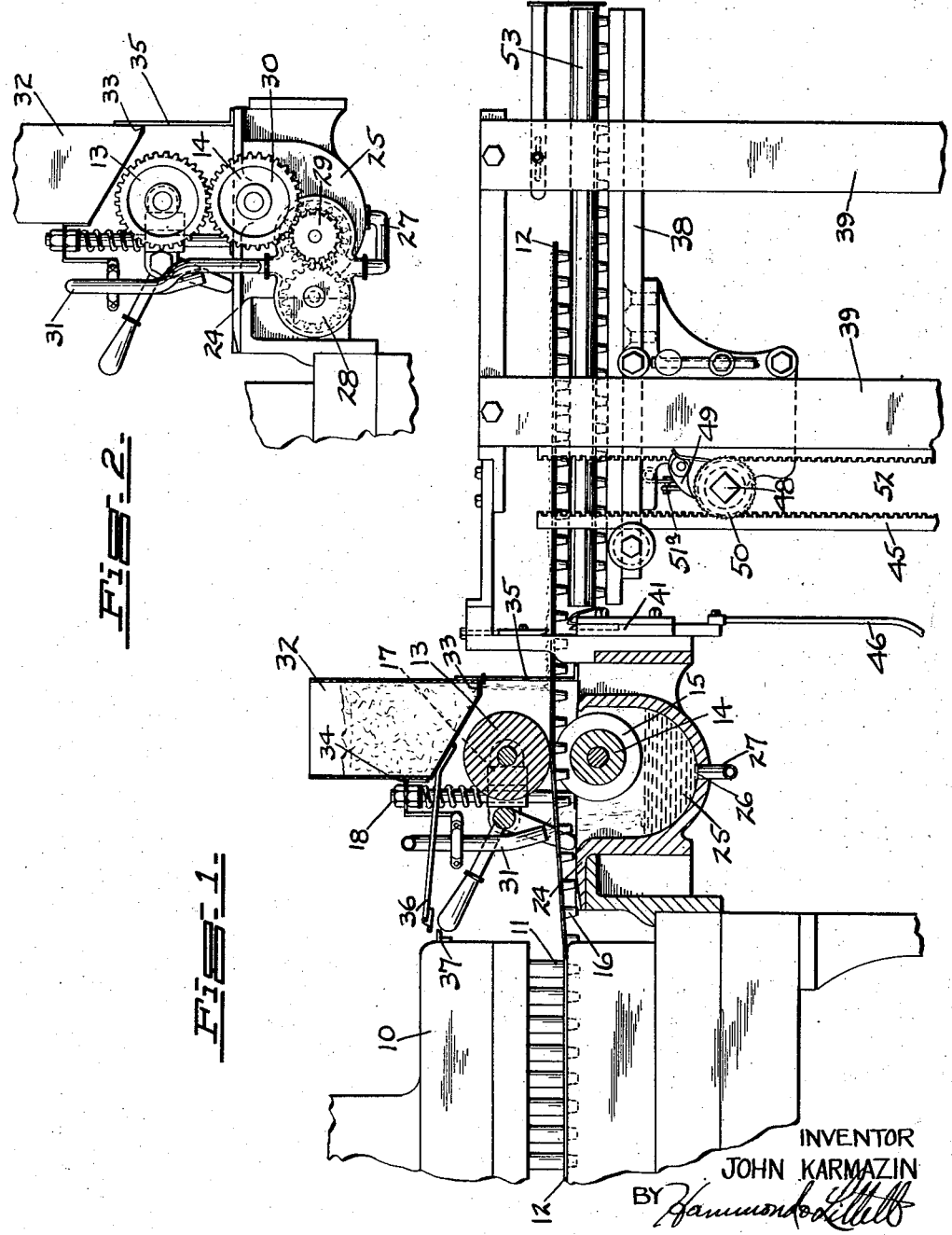
INVENTOR
JOHN KARMAZIN
BY
ATTORNEYS.

March 19, 1929.　　　J. KARMAZIN　　　1,705,572
METHOD AND APPARATUS FOR ASSEMBLING RADIATOR SECTIONS BY SOLDERING
Filed July 10, 1925　　　2 Sheets-Sheet 2
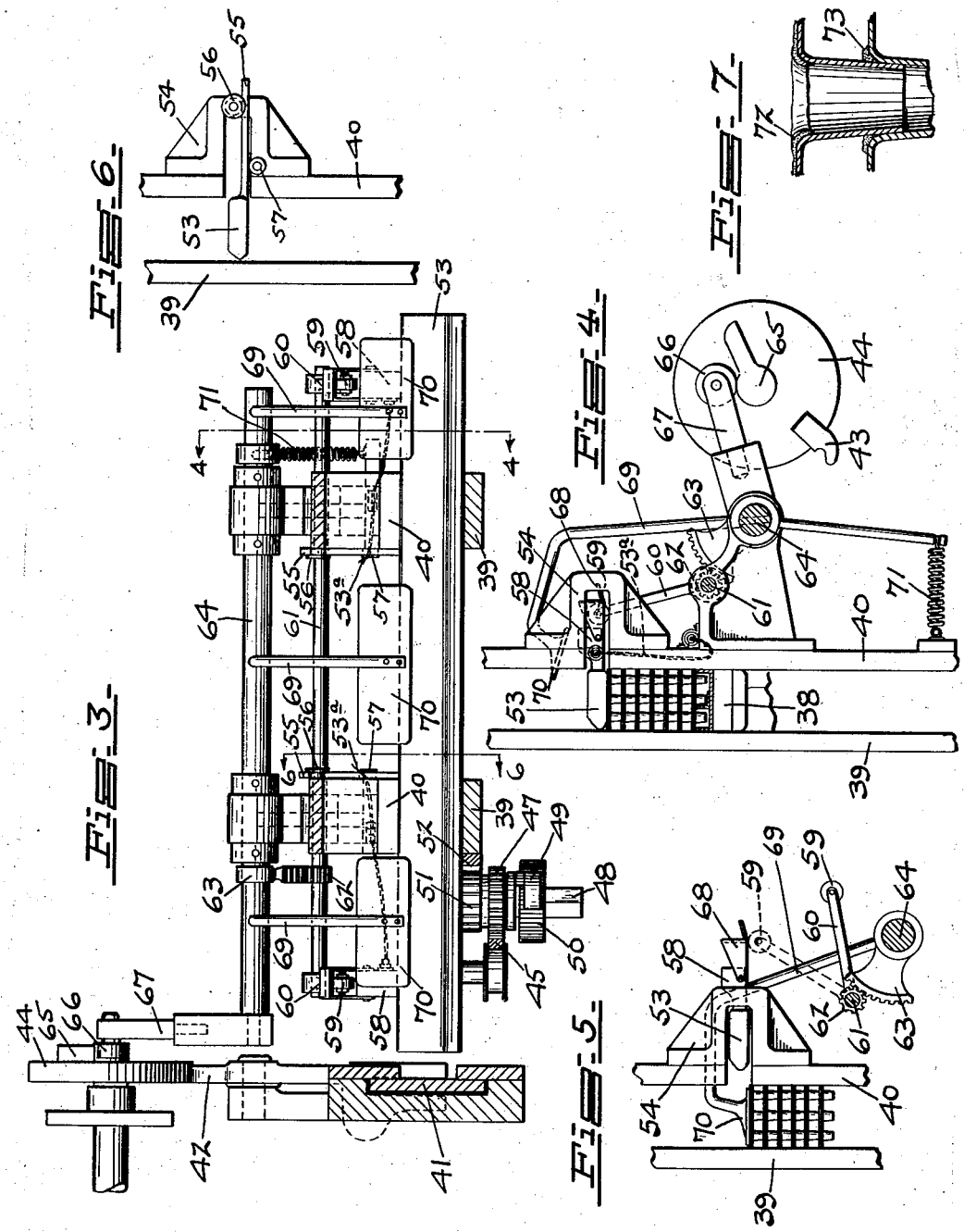
INVENTOR
JOHN KARMAZIN
BY
ATTORNEYS.

Patented Mar. 19, 1929.

1,705,572

UNITED STATES PATENT OFFICE.

JOHN KARMAZIN, OF DETROIT, MICHIGAN.

METHOD AND APPARATUS FOR ASSEMBLING RADIATOR SECTIONS BY SOLDERING.

Application filed July 10, 1925. Serial No. 42,636.

This invention relates to radiator assembling machines, and is particularly adapted for assembling radiators of the type disclosed in my prior co-pending application Serial No. 641,850, filed May 28, 1923.

The radiator disclosed in said application comprises a plurality of superposed fin or web forming elements each provided with a plurality of integral tapering tubular projections, the ends of which are adapted to fit into the tubes of the adjacent fin element to form continuous water conduits through the radiator. In my co-pending application, Serial No. 723,860, filed July 3, 1924, I have disclosed a machine for forming from a strip of sheet metal a strip of radiator element forming material comprising the tapering tubular projections formed integral with the transverse web as above mentioned, with means to sever the formed strip into lengths suitable for radiator use and means to superpose a predetermined number of the severed radiator elements into a stack and to compact the stack into a radiator.

One object of the present invention is to provide a means to unite or solder said tubular projections together to insure watertight conduits through the radiators.

Another object of my invention is to provide a method of soldering superposed radiator elements together whereby each tubular projection will be soldered to the upper inside edge of the one beneath it and the remainder of the tube both above and below the soldered portion will be free from solder, which allows it to more efficiently radiate heat.

Another object of the invention is to provide a machine in which the solder is automatically applied to the elements fused, and the elements soldered together during the formation of the radiator in the machine.

Another object of the invention is to provide a machine in which pulverized solder is applied to the radiator forming element during the formation of a radiator, the element agitated to distribute the solder, and the solder subsequently heated to contact with a soldering iron to hold two of the elements together.

Another object of the invention is to provide means whereby each element is pressed onto the element beneath it while the solder on the lower element is still in a molten or softened state.

Various other objects and advantages will appear as the description of the invention proceeds.

Referring now to the drawings, which illustrate one form of embodiment of my invention,—
Fig. 1 is a part sectional side elevation of a portion of a preferred embodiment of my machine.

Fig. 2 is a side elevation of a portion of the machine of Fig. 1, showing the means for applying the acid.

Fig. 3 is a plan view of the stacking machine shown in Fig. 1.

Fig. 4 is a sectional elevation taken on the line 4—4 of Fig. 3.

Fig. 5 is a view similar to Fig. 4, showing another step in the operation of the machine.

Fig. 6 is a sectional elevation taken on the line 6—6 of Fig. 3.

Fig. 7 is a sectional elevation showing two of the radiator elements soldered together according to my present invention.

In my application Ser. No. 723,860, above referred to, I have shown a machine having a series of upper and lower dies between which a strip of sheet metal is fed, the dies acting so as to form, in a series of steps, portions of the metal into tubular projections extending from the sheet. A portion of such a machine is represented in Fig. 1 in which a reciprocating head 10 carries die members 11, which successively form the projections 16 from the sheet 12, as the sheet is fed through the machine. Continuously driven rollers 13 and 14, driven from the die operating mechanism, tend to keep the strip moving through the machine. The roller 14 has grooves 15 to receive the tubular projections 16 and the rollers slip on the strip when the strip is stopped for each operation of the dies, as described in said co-pending application. The roller 13 is mounted on bearings 17 which are slidably mounted on uprights 18 on the frame of the machine.

Integral with the base or frame 24 of this portion of the machine and below the roller 14, is a tank 25 adapted to receive a fluxing solution, such as hydrochloric acid, which may be applied to the radiator strip as it passes through the machine, and having an opening 26 in its bottom in which is attached the end of the pipe 27, through which the flux may be withdrawn and pumped back to be reapplied to another part of the element. A pump 28 is attached to the outside of the tank 25 and is driven by the gear 29 which meshes with the gear 30 attached to the driving roller 14. The pipe 27 is attached to the inlet side of the pump, and a pipe 31 is attached to the outlet side of the pump, having its free end disposed directly over the strip of metal at a point also over the opening into the tank 25, so that when the pump is in operation, a stream of acid or other flux is played upon the strip 12, the acid running over the edges of the strip and through the tubular projections 16 back into the tank and thence to the pump again.

A hopper 32, disposed above the rollers 13 and 14, is adapted to contain pulverized solder, and has an opening 33 at its lower edge from which a stream of pulverized solder may be caused to flow onto the radiator element forming strip. The hopper 32 is mounted on hinges 34 attached to the upright 18 and legs 35, which rest on the base of frame 24 of the machine. An arm 36 is attached to the bottom of the hopper 32 and is adapted to engage with a lug 37 on the movable head 10 of the die when said head is lowered, thus giving a jolt or vibration to the solder hopper at each downward movement of the forming dies to insure a flow of pulverized solder through the opening 33 in the bottom of the hopper.

A cutting and stacking machine, located in position to receive the strip 12 as it emerges from the rollers 13, 14, comprises a carriage 38 movably mounted between uprights 39 and 40 and adapted to support a stack of radiator forming elements. A knife supporting member 41 is operated intermittently by a lever 42 which contacts with a lug 43, mounted on a disc 44, driven from the die operating mechanism, so as to sever the strip 12 into elements of a predetermined length. The movement of the knife supporting member 41 causes reciprocation of the rack member 45 through the arm 46, as described in my co-pending application above referred to. Meshing with the rack 45 is an idler gear 47, mounted on the shaft 48 and having attached thereto a pawl 49 which engages a ratchet wheel 50 rigidly mounted on the shaft 48. The rack 45 is free to move upwardly without turning the shaft 48, but when it is moved downwardly the pawl 49 engages the ratchet wheel 30 and the shaft 48 is turned in a counter clockwise direction, which causes the carriage 38 to move downwardly, the gear wheel 51 meshing with the stationary rack 52. A friction clutch member 51ª prevents the carriage from moving down except when so moved by the rack 45. In this manner the carriage is caused to be lowered each time an element is cut off from the strip and deposited thereon, as described in my co-pending application, Ser. No. 716,943, filed May 31, 1924.

An electrically heated soldering iron 53 having suitable flexible connections 53ª to a source of electricity is slidably mounted in brackets 54 at a point between and adjacent to the bottoms of the tubular projections on the incoming radiator element strip and the upper surface of the web of an element already deposited on the carriage. Attached to the soldering iron are arms 55 which engage rollers 56 and 57 in such a manner that the soldering iron 53 is supported when it is moved into a position between the uprights 39 and 40. The lugs 58 are also attached to the soldering iron 53 and are adapted to receive rollers 59 mounted on the ends of actuating arms 60 which are attached to the shaft 61. The shaft 61 is rotated by means of a small gear 62 which meshes with a sector gear 63 attached to the shaft 64. The shaft 64 is oscillated by a cam 65 driven from the die operating mechanism which engages with a roller 66 attached to an arm 67, which in turn is attached to the shaft 64.

Guide plates 68 are pivotally mounted on the lugs 58 and are engaged by the rollers 59 to move the soldering iron 53 away from its operating position. The guide plates 68 also allow the arms 60 to continue to the position shown in full lines in Fig. 5 and insure the proper seating of the roller 59 when it returns, as in dotted lines (Fig. 5), to move the soldering iron back into its operating position.

Presser arms 69, attached to the shaft 64, actuate the presser feet 70 to exert a downward pressure on the upper radiator forming element, as shown in Fig. 5, thereby telescoping the tubular projections on said element into those of the one beneath it. A spring 71 keeps the presser feet normally in a raised position and the soldering iron in its operating position between the uprights 39 and 40.

The operation of the machine is as follows:

Assume one element has already been placed upon the carriage of the stacking machine. A strip of metal 12 is drawn by the rollers 13 and 14 through the strip-forming machine 10 which forms the tubular projections thereon and is cleaned and fluxed by a stream of acid from the pipe 31. It is then sprinkled with pulverized solder from the hopper 32. Some of the solder falls through the tubular projections and some clings to the top of the tubular projections, as shown at 72 (Fig. 7). The sudden intermittent movement or jumping of the strip as it is alternately held and released by the dies as described in said application Ser. No. 723,860, insures even distribution of the solder on the strip and at the same time shakes off any excess solder that might have been deposited there. The heat from the iron causes the solder on the strip already on the carriage to assume a molten or softened state and at the same time heats the lower portions or ends of the projections of the next element which is being advanced along the top of the iron by the rollers.

When a predetermined length of strip has been disposed above the iron, the cutter operates and the carriage lowers a suitable distance. The cam 65 then contacts with the roller 66, thereby turning the shaft 64 which starts the presser arms toward their operating position as shown in Fig. 5. The gears 63 and 62, however, are so proportioned as to cause the arms 60 to move faster than the presser arms 69, with the result that the soldering iron is drawn out from under the cut-off element before the presser arms have had time to function. The withdrawal of the iron allows the element to drop upon the deposited element already on the carriage 38 where the presser feet act immediately to force the element into telescoping relation with the one beneath it. The solder being in a molten or softened state, fuses the two elements together to form conduits as shown in Fig. 7. It is to be noted that the elements fuse together at a point adjacent to the plane of the fin or web portion of the element, as shown at 73 (Fig. 7). This leaves the remaining portions of the tube, both above and below the soldered point, free of solder, which prevents the decrease of efficiency of the radiator occurring when the tubes are coated with solder due to the relatively poor heat conducting properties of solder.

The roller 66, having passed over the cam 65, the spring 71 turns the shaft 64 back to its normal position, which lifts the presser arms and causes the rollers 59 on the arms 60 to engage with the lugs 58 on the iron to quickly slide the iron back in place between the uprights 39 and 40, where it contacts with the upper surface of the web or fin of the radiator forming element just deposited.

The machine continues to operate in this manner until it is automatically stopped after a sufficient number of elements have been stacked and soldered. The stack thus formed is removed, the carriage raised again to the proper height, and the operation of the machine repeated as described.

It is to be understood that various forms and modifications of my invention may be resorted to without departing from the spirit of the invention or the scope of the appended claims.

I claim:

1. In a machine of the class described, the combination of a radiator element forming device, means to treat the elements formed in said device with a flux solution, means to apply pulverized solder to said elements, said solder applying means being periodically agitated by the forming die, means to stack said elements in superposed relation, means to heat the bottom of one element and the top of the adjacent element, means to withdraw the heating means from between the elements, means to immediately thereafter press said elements together, said heating and pressing means being periodically removed to permit the insertion of an additional element and being positively operated by the die forming device.

2. In a radiator element forming, cutting, stacking and soldering machine, means to treat a strip of radiator forming material with a solution of flux, means to apply pulverized solder to said strip, means to cut said strip into radiator elements and stack said elements, means to heat each element as it is fed to the stacking machine and solder said element to the element adjacent to it, all of said means being positively and periodically operated by the movement of the forming die.

3. In a radiator manufacturing machine, means to treat a strip of radiator element forming material with a soldering flux, means to apply solder to said strip, said means comprising a hopper above said strip having an orifice and being periodically agitated by the forming die, means to cut radiator elements from said strip, means to stack the radiator elements cut from said strip, means to heat the elements cut from said strip consisting of an electrically heated soldering iron, adapted to contact with said strip, means to press each element as it is cut off and while it is still hot, into the adjacent element, said heating and pressing means being automatically operated relative to said forming die.

4. In a machine for manufacturing radiators, means to draw a strip of radiator element forming material through said machine, a reservoir disposed beneath said strip, a nozzle disposed above said strip and said reservoir, means located between said reservoir and said nozzle to cause liquid in said reservoir to flow out of said nozzle, a hopper having an orifice in the bottom thereof, disposed above said strip, means to agitate said hopper to allow the contents to flow freely through the orifice, means to cut the strip into radiator elements, means to stack the elements in superposed relation, an electrically heated soldering iron slidably mounted beneath and in contact with the end of said strip as it is fed to the stacking machine, means for withdrawing said soldering iron to allow an element cut from the end of said strip to drop on to the adjacent element and for replacing said iron to heat the upper portion of said element and the lower portion of the end of said strip, and presser feet adapted to operate upon a newly cut element when the iron is withdrawn from beneath said element to press said element upon the element beneath it.

5. In a machine for manufacturing radiators, means to treat a strip of radiator element forming material with a soldering flux, means to apply pulverized solder to said strip, means to cut said strip into radiator elements, means to stack said elements in superposed relation, an electrically heated soldering iron adapted to heat each element as it is fed to the stacking means, cam means to remove said iron for a relatively short interval of time from contact with said element to allow another element to be placed upon said first element, means connected to said last mentioned means to press said elements together while said iron is removed, and means to repeat the foregoing operations until a predetermined number of elements have been stacked into a radiator.

6. In a machine for manufacturing radiators, the combination with a radiator element forming die and means to operate the die for forming fin and integral tubular projections on a metal strip, of means to treat the elements formed by said die with a flux, means to supply solder to said elements, said solder supplying means comprising a hopper periodically agitated by said die, means to stack the elements in superposed relation, means to heat adjacent elements and automatic means to press said adjacent elements together operated by the movement of the forming die.

7. A method of soldering subsequent radiator elements of the integral fin and tube type to a partial stack thereof to complete the stack which comprises the steps of treating the elements with a spray of flux, applying solder from a source above said elements, automatically heating the co-acting parts of the adjacent elements during the continuance of the movement of the elements through the machine and subsequently pressing subsequent elements to the stack.

8. The method of soldering radiator elements of the integral fin and tube type to a partially completed stack thereof which comprises the steps of individually treating each element during the formation thereof with a liquid flux, applying pulverized solder to the upper surface of each of said elements, simultaneously heating the lower portion of the formed element and the upper portion of the top-most element of the partially completed stack and subsequently pressing said element to the stack.

9. A method of soldering together radiator elements having fin portions and integral tubular projections thereon which comprises applying solder to the fin portions of a free element, simultaneously and automatically heating the fin portion of a partially stacked element and the tubular projection of the free element as the free element passes through the machine and periodically raising the pressing and heating members to receive additional free elements and subsequently pressing said heated portions together.

In testimony whereof I have affixed my signature to this specification.

JOHN KARMAZIN